United States Patent [19]

Hara et al.

[11] Patent Number: 5,617,280

[45] Date of Patent: Apr. 1, 1997

[54] SUPERCONDUCTING FAULT CURRENT LIMITER

[75] Inventors: Tsukushi Hara, Yono; Takeshi Ohkuma, Tokyo; Takahiko Yamamoto, Tokyo; Daisuke Ito, Tokyo; Kazuyuki Tsurunaga, Tokyo; Takamitsu Tada, Tokyo, all of Japan

[73] Assignees: The Tokyo Electric Power Company, Incorporated, Tokyo; Kabushiki Kaisha Toshiba, Kawasaki, both of Japan

[21] Appl. No.: 355,340

[22] Filed: Dec. 12, 1994

Related U.S. Application Data

[63] Continuation of Ser. No. 893,019, Jun. 3, 1992, abandoned.

[30] Foreign Application Priority Data

Jun. 4, 1991 [JP] Japan ................................. 3-133064

[51] Int. Cl.⁶ ....................................................... H02H 9/00
[52] U.S. Cl. ............................. 361/19; 505/850; 505/883
[58] Field of Search ................................ 361/19, 58, 63, 361/141; 505/850, 872, 883, 888

[56] References Cited

U.S. PATENT DOCUMENTS

| | | | |
|---|---|---|---|
| 3,267,306 | 9/1963 | Hassel et al. ............................ | 505/88 |
| 4,015,168 | 3/1977 | Massar ..................................... | 361/19 |
| 4,409,579 | 10/1983 | Clem et al. ............................. | 335/216 |
| 4,700,257 | 10/1987 | Bekhaled ................................ | 361/19 |
| 5,021,914 | 6/1991 | Tsurunaga et al. ..................... | 361/19 |

OTHER PUBLICATIONS

Toshiba Review 1991 vol. 46 No. 5 "Superconducting Fault Current Limiter" pp. 417–419, T. Hara, et al.

Primary Examiner—Jeffrey A. Gaffin
Assistant Examiner—Sally C. Medley
Attorney, Agent, or Firm—Oblon, Spivak, McClelland, Maier & Neustadt, P.C.

[57] ABSTRACT

A current limiter having a plurality of current limiting units provided for electric paths constituting a plurality of phases. Each current limiting unit is constituted by a superconducting coil functioning as a first current limiting element formed in a non-inductive winding manner by connecting two superconducting coils in series, which superconducting coils are wound in opposite directions and equal in size and number of turns, and a superconducting coil functioning as a second current limiting element connected in parallel to the first current limiting element and having a predetermined impedance value. These current limiting units are contained within a cryostat and separated by a magnetic shield member for electromagnetically isolating the respective phases.

11 Claims, 4 Drawing Sheets

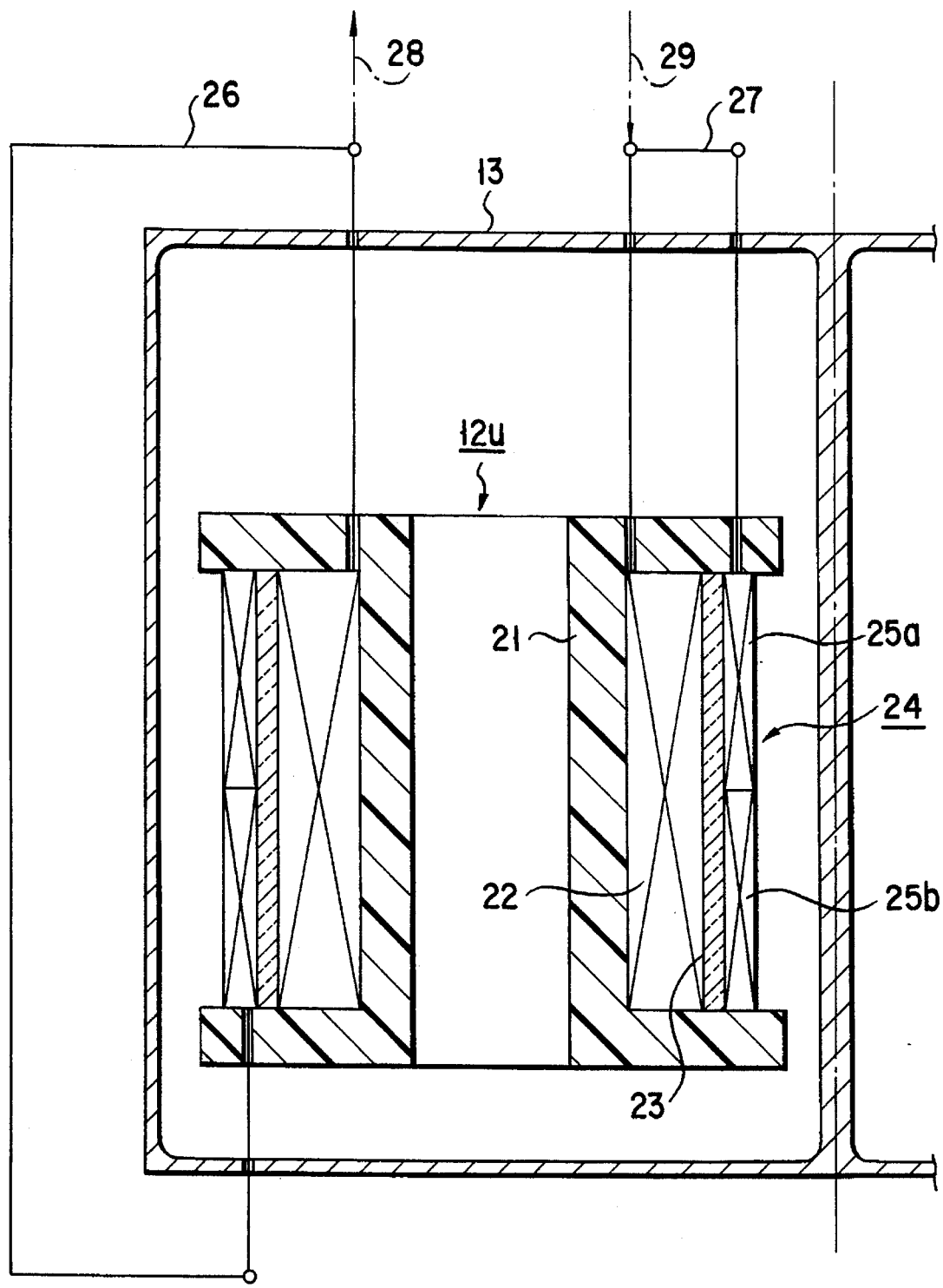
F I G. 3

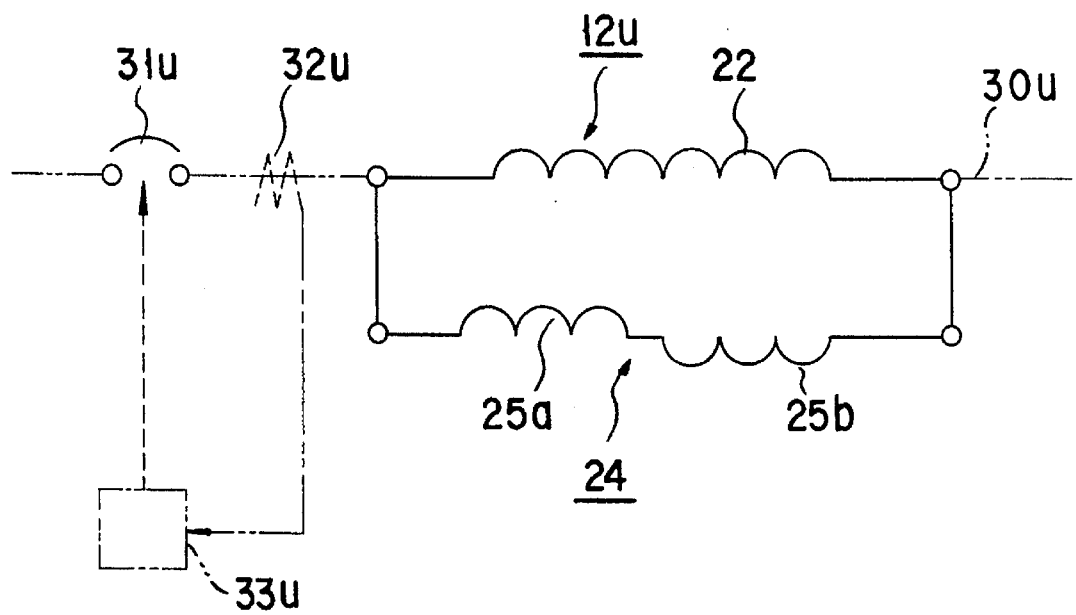
F I G. 4
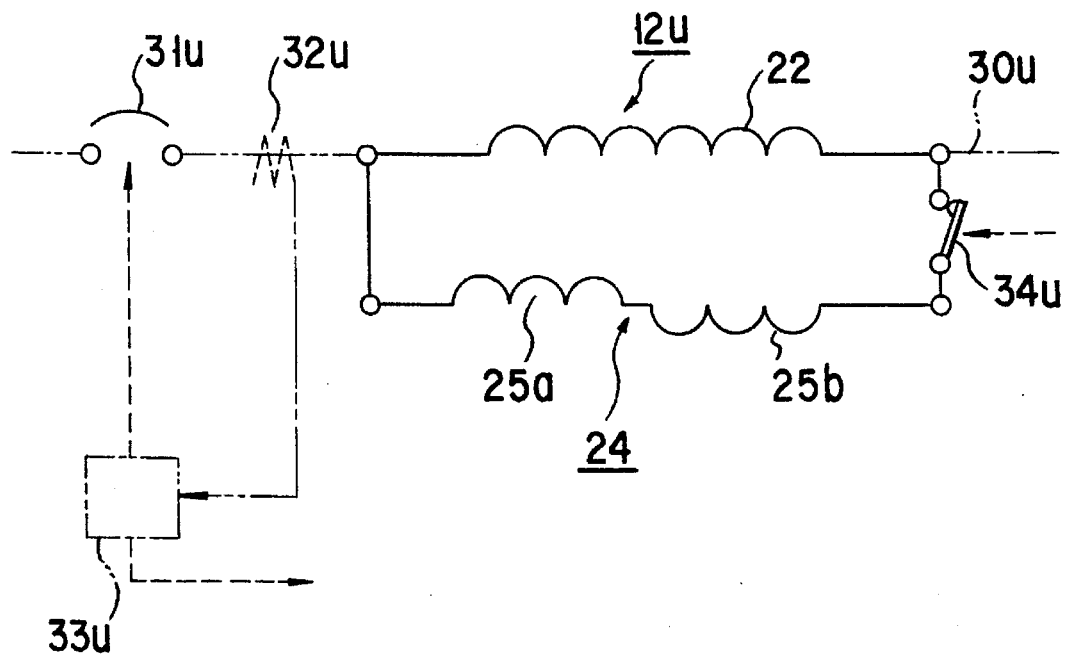
F I G. 5

SUPERCONDUCTING FAULT CURRENT LIMITER

This application is a Continuation of application Ser. No. 07/893,019, filed on Jun. 3, 1992, now abandoned.

BACKGROUND OF THE INVENTION

1. Field of the Invention

The present invention relates to a current limiter, provided in an AC electric path, which operates automatically when an overcurrent (short-circuit current) has started to flow in the electric path, thereby limiting the current value to a safe level instantaneously.

2. Description of the Related Art

Conventionally, in order to protect a power transmission/distribution system, a circuit protection system is employed. In this system, an overcurrent sensor senses an overcurrent in an electric path. A limiting element (LE) is activated by an output from the sensor, thereby separating the electric path from a power source.

In the above circuit protection system, however, in case of a "short-circuit accident", for example, a large current flows through a part of the electric path during a short time period needed for the start of operation of the limiting element. Thus, an electric circuit structure capable of withstanding the large current must be employed. In addition, a limiting element having a large breaking capacity must be used.

For the above reason, it has recently been thought that a current limiter is provided on the power source side of the electric path. The moment an overcurrent starts to flow in the electric path, the current limiter reduces the overcurrent to a safe value. This current limiter must meet the following conditions:

(1) A voltage drop in a normal condition is very small.

(2) An impedance rises quickly the moment a current above a predetermined value starts to flow.

(3) Maintenance is easy and repeated use is allowed.

As a current limiter which meets the above conditions, there is conventionally known a current limiter having a current limiting element formed of a low melting point metal. Specifically, in the current limiter, the limiting element is formed of NaK or a low melting point metal. The limiting element is connected in series to the electric path. The moment a current above a predetermined value starts to flow in the limiting element, NaK is vaporized to obtain a high impedance.

However, in the conventional current limiter having the above structure, a variation occurs in current value at which current limit begins, i.e. vaporization occurs, due to "sealing condition" or "solidification condition" of NaK. Thus, the stability in operation of the current limiter is not reliable.

In the case of alternating current, a current limiter must be provided for each of three phases, resulting in an increase in size of the current limiter. Further, the increase in size raises the running cost of the current limiter.

For example, in the case of a current limiter utilizing superconductivity, if "short-circuit accident" of one phase occurs, the current limiters for the other phases are induced by the strong magnetic flux produced by the superconducting coil for the "accident" phase, and "normal conduction transition" occurs in these current limiters.

Thus, the current limiter for electric power using the conventional system has a low reproductivity of the limit start current value, and low reliability and safety in operation.

SUMMARY OF THE INVENTION

The object of the present invention is to provide a superconducting fault current limiter by which the above problems are solved.

In order to achieve this object, there is provided a current limiter comprising: a number of current limiting units provided respectively for a plurality of phases constituting an electric path, each current limiting unit being constituted by a first current limiting element formed by non-inductively winding a superconducting wire having a critical current value lower than a limit current value of the electric path and higher than a rated current value, and a second current limiting element having a fixed impedance value and connected in parallel to the first current limiting element, the number of the current limiting units being equal to the number of the phases; and separating means for electromagnetically separating the respective current limiting units for the corresponding phases.

By this structure, the following advantages are obtained.

The current limiting unit in which the first and second current limiting elements are connected in parallel is connected in series to the electric path. The first current limiting element is formed by non-inductive winding with a superconducting wire having a critical current value (i.e. current limit start target value) lower than a limit current value of the electric path and higher than a rated current value of the electric path. Thus, when the current value is less than the current limit start target value, the impedance is substantially zero. Accordingly, in the non fault state, the electric path current flows through the first current limiting element and does not flow through the second current limiting element. At this time, the voltage drop in the first current limiting element is negligibly low.

When the current path current value has exceeded the limit start target value, the superconducting wire of the first current limiting element transits instantaneously to the normal conduction state. As a result of the transition, the impedance of the first current limiting element increases to several-ten $\Omega$, which is higher than the impedance of the second current limiting element. The increase in impedance makes easier the flow of most of the electric path current to the second current limiting element. Accordingly, the electric path current value is limited to a sufficiently low value determined by the impedance of the second current limiting element.

In general, the superconducting wire, which has once transited to the normal conduction state, keeps the normal conduction state unless and until it is cooled to the superconducting transition temperature. Thus, the electric path current is kept at a remarkably low value, compared to the case where the current limiter is not provided. Normally, the critical current value of the superconducting wire is kept at stable, substantially fixed value. As a result, the apparatus having the current limiting units can maintain running stability.

The current limiting units for the corresponding phases are electromagnetically separated by the partition member. Thus, for example, in case of "one-line ground accident", it is possible to prevent a situation from occurring in which the superconducting coils of the current limiting units for accident-free phases are transited to the normal conduction state by the magnetic flux of the second current limiting element of the current limiting unit for the "accident" phase. Thus, the stability and reliability of the current limiter can be enhanced.

Further, since the current limiting units corresponding to a plurality of phases are stored within a single cryostat, overlapping structural elements in actual use can be omitted. For example, only one refrigerator may be provided for cooling the coolant. As a result, the size of the overall apparatus can be reduced, and the running cost of cooling power, etc. can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a vertical cross-sectional view of a current limiting unit provided for each phase;

FIG. 4 is a circuit diagram illustrating the connection relationship between the current limiting unit and an electric path; and FIG. 5 is a circuit diagram showing the structure of a current limiter according to another embodiment of the invention.

DETAILED DESCRIPTION OF THE PREFERRED EMBODIMENTS

Figure 1:
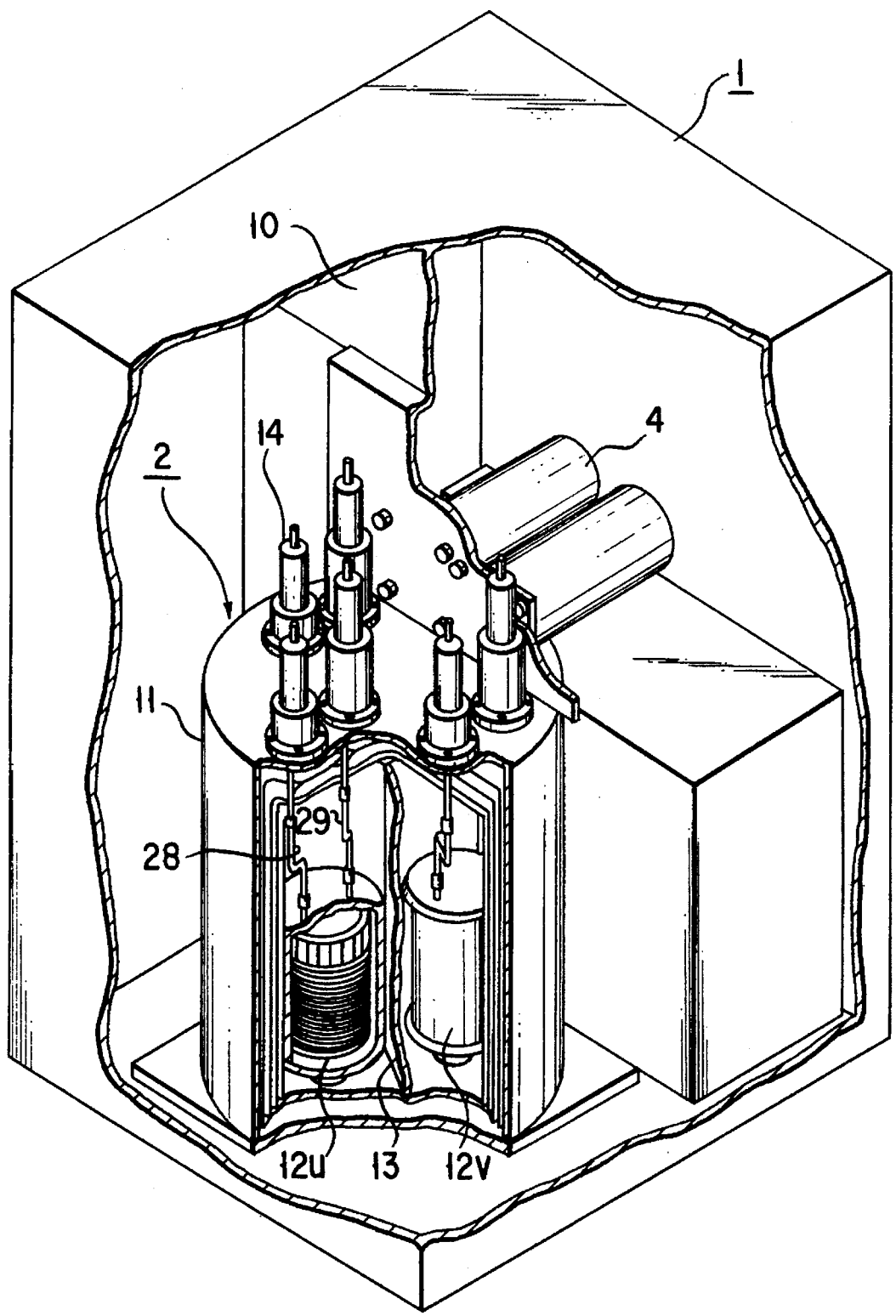
FIG. 1 is a partially cut-out perspective view showing an overall three-phase current limiter according to an embodiment of the present invention.

A current limiter according to an embodiment of the invention, as shown in FIG. 1, is used in a power distribution line of three-phase 6.6 kV and rated power of 2 kA. In this current limiter, the current limit start current value Id (i.e. peak value) is set at 5 kA.

In FIG. 1, a cubicle 1 contains a current limiter 2, a limiting element (not shown), phase separation buses (not shown) for connecting the current limiter 2 to external electric paths, and a helium refrigerator 4.

The current limiter 2 comprises a cryostat 11; a U-phase current limiting unit 12u, a V-phase current limiting unit 12v and a W-phase current limiting unit (not shown) which are arranged within the cryostat 11 symmetrically (with respect to the center of the cryostat 11); liquid helium (not shown) put in the cryostat 11 up to a level where the respective current limiting units are immersed; a magnetic shield member 13 arranged in the cryostat 11 in such a shape as to magnetically separate the respective current limiting units; and bushings 14 hermetically penetrating the upper wall of the cryostat 11 to connect both terminals of each current limiting unit to corresponding phase separation buses.

The cryostat 11 is constituted by an inner container an outer container, and three heat-insulating layers provided between the inner and outer container. Each heat-insulating layer is provided with a vacuum heat-insulating layer and a heat-shielding plate kept at a temperature level of liquid nitrogen. The inner container contains the respective current limiting units (12u, 12v . . . ), liquid helium and magnetic shield member 13. The level of the liquid helium is always kept constant by the helium refrigerator 4.

The cryostat including the current limiter is separated by a partition wall 10 from the refrigerator for cooling the cryogen circulating in the cryostat. The cryostat and the refrigerator are integrated within the same cubicle, thereby separating the high-voltage section having the space including the cryostat from the low-voltage section, and ensuring safety for an operator.

Figure 2:
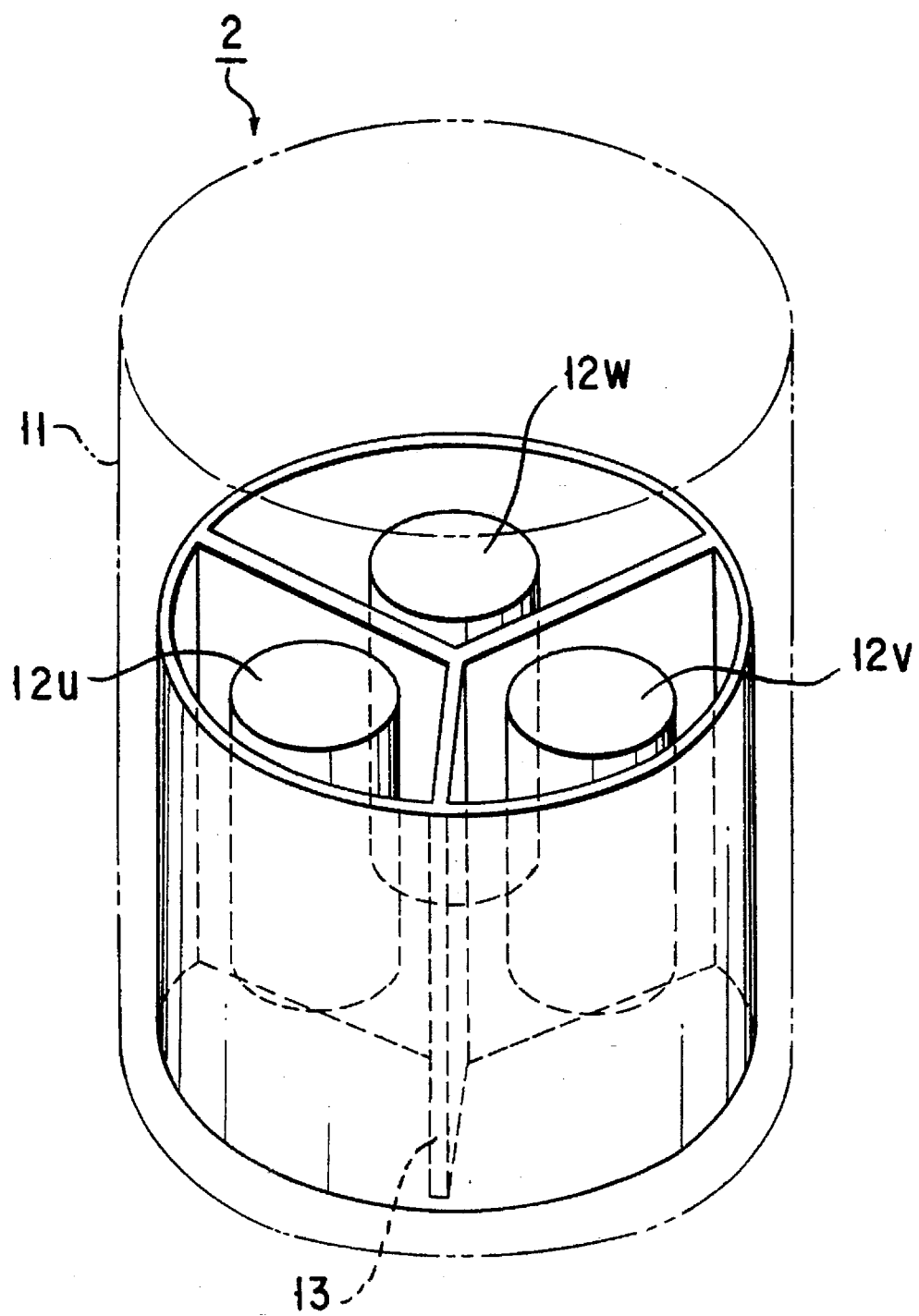
FIG. 2 is a schematic perspective view of a three-phase current limiter.

FIG. 2 schematically shows the state in which the respective current limiting units are actually stored. The current limiting units 12u, 21v and 12w have the same structure. The three units are juxtaposed longitudinally in the substantially cylindrical sealed cryostat 11. The magnetic shield member 13 for shielding magnetic flux and ensuring electromagnetic magnetic isolation is situated as partition wall between the respective units.

The inner surface of the cryostat 11 is plated with a material identical to the material of the magnetic should member 13.

Referring to FIG. 3, the current limiting units will now be described in detail, taking the U-phase current limiting unit 12u as a representative example. As is shown in the cross-sectional view (see FIG. 3), the current limiting unit 12u is constituted by a plurality of superconducting coils and is separated from the other two current limiting units 12v and 12w (not shown) by the magnetic shield member 13 serving as a partition wall for electromagnetic isolation. A superconducting coil 22 functioning as a second current limiter is mounted on the outer periphery of a bobbin 21 formed of a non-magnetic, electrically insulating material. Further, a superconducting coil 24 functioning as a first current limiter composed of upper and lower superconducting coils 25a and 25b is mounted on the outside of the superconducting coil 22 with a heat insulating member 23 interposed.

The superconducting coil 22 is formed by winding a superconducting wire of an alloy material of NbTi, NbZr, etc., a compound material of $Nb_3Sn$, $V_3Ga$, etc. or an oxide material. The wire has a critical current value Isa which several times a current limit start target value Id. The impedance of the wire is set to be about several $\Omega$.

On the other hand, the superconducting coil 24 is formed such that the two superconducting coils 25a and 25b of opposite winding directions are connected in series. These superconducting coils 25a and 25b are equal in size and number of turns. Since the coils 25a and 25b are wound in opposite directions, their magnetic fields are mutually canceled and a so-called "non-inductive" coil is realized. These superconducting coils 25a and 25b may be connected in parallel. Each superconducting coil 25a, 25b is formed of an alloy material of NbTi, NbZr, etc. or a compound material of $Nb_3Sn$, $V_3Ga$, etc., and has a very fine multi-core structure wherein the diameter of a superconducting filament is 1 micron or less. The matrix of the wire material is a high-resistance material of Cu-10Ni or Cu-30Ni, wherein the critical current value Isb is equal to the current limit start target value Id. Thus, in the normal condition, the impedance of the superconducting coil 24 is nearly zero. Once the coil 24 is transited to normal conduction state, it has an impedance (as a resistance) of several-ten $\Omega$.

As is shown in FIG. 3, the superconducting coils 22 and 24 are connected in parallel by conductors 26 and 27. Both ends of this parallel circuit are connected, as shown in FIG. 1, to center conductors of the bushings 14 via power leads 28 and 29 formed of oxide superconducting wires each having a silver or stabilizing portion with a cross sectional area of 3 mm 2. Connection portions between the power leads 28 and 29 and the center conductors of bushings 14 are thermally connected to the heat shield plate situated in the heat insulating layer of the cryostat 11 via an insulating member such as aluminum nitride with high thermal conduction. Each flange of the bobbin 21 has two or more openings (not shown) for passing liquid helium between the respective coil layers.

The magnetic shield member 13 is formed of a superconducting member of Nb, NbTi, $Nb_3Sn$, NbZr, $V_3Ga$, an oxide superconductor, etc., or a member having a layer of these substances on its surface.

FIG. 4 shows an electric connection mode of one phase (e.g. U-phase) between the current limiting unit and the electric path. As has been stated above, the superconducting coils 22 and 24 which constitute the U-phase current limiting unit 12u are connected in parallel, and this parallel circuit is connected in series to the U-phase electric path 30u. A limiting element 31u is provided in the U-phase electric path on the power source side of the U-phase current limiting unit 12u. A current transformer 32u is provided between the limiting element 31u and the U-phase current limiting unit 12u. An output from the current transformer 32u is delivered to an overcurrent detector 33u. The overcurrent detector 33u outputs a signal for shutting off the limiting element 31u at a time point after a predetermined period T1 from a time point at which the peak value of the current flowing through the U-phase electric path 30u exceeds 4 kA.

The operation of the current limiter having the above structure will now be described with reference to the U-phase structure shown in FIG. 4.

In the normal condition, the superconducting coils 22 and 24 are superconductive, and the impedance of the superconducting coil is several Ω. The impedance of the superconducting coil 24, which is wound in the non-inductive mode, is nearly zero Ω. Thus, the current (e.g. U-phase electric path current) flowing in the U-phase electric path flows through the superconducting coil 24 and does not flow through the superconducting coil 22. The superconducting coil 24 is formed of a superconducting wire having a critical current value Isb equal to the current limit start target value Id. Accordingly, impedance does not increase while the U-phase electric path current is less than the current limit start target value Id, and the U-phase electric path current flows through the superconducting coil 24 continuously. At this time, the voltage across both ends of the superconducting coil 24 is negligibly low.

When the U-phase electric path current increases due to "short-circuit accident" or the like and the peak value of the U-phase electric path current has exceeded the current limit start target value Id, the superconducting coil 24 transits instantaneously to the normal conduction state. Thus, the impedance of the superconducting coil 24 increases in the order of several-ten Ω instantaneously. When the impedance of the coil 24 increases abruptly, in this way, most of the U-phase electric path current flows to the other superconducting coil 22. More specifically, since the impedance of the superconducting coil 22 is lower than that of the superconducting coil 24 which has transited to the normal conduction state, most of the U-phase electric path current easily flows to the superconducting coil 22. Thus, the U-phase electric path current is limited to the value determined by the impedance of the superconducting coil 22, and the function of the current limiter is achieved.

Once the superconducting coil 24 has transited to the normal conduction state, it does not restore to the superconducting state as long as a current flows therethrough. In this embodiment, when the peak value of the electric path current reaches 4 kA, the overcurrent detector 33u operates to produce an output for turning off the limiting element 31u. Thus, the downstream side of the limiting element 31u is completely separated from the power source. Accordingly, in case of an accident, the limiting element 31u functions both to separate the U-phase electric path 30u from the power source and to restore the superconducting coil 24 to the superconducting state.

As has been described above, "current limiting effect" is achieved by utilizing the "critical current property" of the superconducting wire. The critical current value is stably determined by the quantity of superconducting filaments, etc. Thus, only if the superconducting coil 24 is formed of a wire having a critical current value equal to the current limit start target value Id, the current limiting operation can surely be performed at the time the electric path current has exceeded the current limit start target value Id.

By virtue of the structural features that the current limiting units for the respective phases are situated substantially regularly (e.g. equiangularly at about 120°) within the cryostat 11 and the respective units are partitioned by the magnetic shield member 13, the current limiting units for the respective phases can be made magnetically independent from each other. For example, in case of "one-line ground accident", it is possible to prevent a situation from occurring in which the superconducting coils 24 of the current limiting units for accident-free phases are transited to the normal conduction state by the magnetic flux of the superconducting coil 22 of the current limiting unit for the "accident" phase. Thus, the reliability of the current limiter can be enhanced.

In addition, when the superconducting coil 24 is formed of a very fine multi-core superconducting wire having superconducting filaments each with a diameter of 1 micron or less, as in the above embodiment, an AC loss due to "self-magnetic field" during power conduction can be decreased, and the safety of the superconducting wire enhanced.

The present invention is not limited to the above embodiments. When the superconducting coil 24 transits to the normal conduction state, heat is generated in the superconducting coil 24 and the heat increases consumption of liquid helium. Accordingly, for example, in order to prevent the increase of consumption of liquid helium and achieve quick restoration to the superconducting state, it is possible to provide a high-speed switch 34u in series to the superconducting coil 24, as shown in FIG. 5 showing a modification of the embodiment, and turn off the high-speed switch 34u by an output from the overcurrent detector 33u.

Further, in the above embodiments, the second current limiting element is composed of the superconducting coil 22, and the coil 22 and the superconducting coil 24 functioning as the first current limiting element for triggering are mounted on the same bobbin; however, as a modification, these coils 22 and 24 may be mounted on separate bobbins. Moreover, it is possible to constitute the second current limiting element by a normal conduction coil, and to situate this second current limiting element outside the cryostat.

Other modifications may be made without departing from the spirit of the present invention.

As has been described above, according to the present invention, the following advantages, in addition to the advantages of the conventional superconducting current limiter, can be obtained by the integral structure of the current limiting units which characterizes the invention.

Specifically, the following advantages can be obtained by the structure in which a plurality of current limiting units for corresponding phases are integrally housed within a single cryostat, with the respective limiting units being electromagnetically isolated from each other by a magnetic shield member.

(1) In case of "short-circuit accident", it is possible to prevent a situation from occurring in which the superconducting coils of the current limiting units for accident-free phases are transited to the normal conduction state by the magnetic flux of the superconducting coil of the current limiting unit for the "accident" phase.

(2) A refrigerator is not required for each phase. A plurality of current limiting units corresponding to plural phases of AC can be cooled by a single refrigerator in actual use. Thus, compared to the prior art in which a refrigerator (e.g. three in total) is required in actual use for each phase (e.g. three phases), the cost of cooling power W can be reduced (i.e. power for two machines<W<power for three machines), and the size of the current limiter itself can be reduced.

(3) The cryostat containing the current limiter and the refrigerator for cooling the cryogen circulating in the cryostat are separated by a partition wall and integrated within a single cubicle. Thus, the high-voltage section and the low-voltage section are separated to ensure safety for the operator.

As has been stated above, the present invention can provide a small-sized current limiter with improved performance, reliability and safety.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A three-phase superconducting fault current limiter, comprising:

plural superconducting current limiting units provided respectively for plural phases constituting an AC electric path, each current limiting unit comprising,
a superconducting current limiting element formed by a non-inductive winding of a superconducting wire having a critical current value that is lower than a limit current value of the electric path and that is higher than a rated current value, and
an additional current limiting element having a fixed impedance value and connected in parallel to said superconducting current limiting element;
a cryostat for containing said superconducting current limiting units and for keeping said superconducting current limiting units at a very low temperature, an inner surface of the cryostat being formed of a superconducting member; and
a separator for electromagnetically separating each of said plural superconducting current limiting units, said separator being formed of one of a superconducting member and a member having a superconducting layer on a surface thereof.

2. The superconducting fault current limiter according to claim 1, wherein
said additional current limiting element comprises a superconducting coil formed by winding a superconductive wire of a predetermined alloy, a compound of material, or an oxide material.

3. The superconducting fault current limiter according to claim 1, wherein the number of said current limiting units is three, said separator has three spaces, and said superconducting current limiting units are arranged substantially point-symmetrically via said separator within said cryostat.

4. The superconducting fault current limiter according to claim 1, wherein said superconducting fault current limiter is contained within a cubicle along with a limiting element for cutting off electricity supplied to the superconducting current limiting units from a power source, a phase separation bus for connecting the superconducting fault current limiter to an external electric path, and a refrigerator for cooling a cryogen circulating in the cryostat.

5. The superconducting fault current limiter according to claim 1, further comprising a bushing penetrating an upper wall of the cryostat hermetically, for connecting both ends of one of said superconducting current limiting units to corresponding phase separation bus.

6. The superconducting fault current limiter according to claim 1, further comprising a high-speed switch connected in series to said superconducting current limiting element, and an overcurrent detector, connected to the high-speed switch and the electric path, for detecting an overcurrent flowing through the electric path,
wherein said high-speed switch is constituted to be turned on/off by an output from the overcurrent detector.

7. The superconducting fault current limiter according to claim 1, wherein said superconducting current limiting element and said additional current limiting element are constituted by superconducting coils mounted on different bobbins.

8. The superconducting fault current limiter according to claim 1, wherein said additional current limiting element is constituted by a normal conduction coil and is provided outside the cryostat.

9. The superconducting fault current limiter according to claim 1, wherein said separator is formed of a superconducting member of an alloy of Nb, NbTi, $Nb_3Sn$, NbZr, $V_3Ga$, an oxide superconducting member, or a member having a layer of said alloy on its surface.

10. The superconducting fault current limiter according to claim 1, wherein an inner surface of said cryostat is formed of a superconducting member of an alloy of Nb, NbTi, $Nb_3Sn$, NbZr, $V_3Ga$, an oxide superconductor, or a member having a layer of said alloy on its surface.

11. A three-phase superconducting current limiter, comprising:

three superconducting current limiting units provided respectively for three phases constituting an AC electric path, each current limiting unit comprising,
a first current limiting element formed by a non-inductive winding of a superconducting wire having a critical current value that is lower than a limit current value of the electric path and that is higher than a rated current value, and
a second current limiting element having a fixed impedance value and connected in parallel to the first current limiting element;

a cryostat containing said three superconducting current limiting units which are situated in the cryostat so that when the cryostat is filled with a cryogen the three superconducting current limiting units are immersed in the cryogen;

a separator for electromagnetically separating the three current limiting units for the corresponding phases, said separator being provided within said cryostat, said separator comprising one of a superconducting member and a member having a superconducting layer on a surface thereof; and a superconducting coating on an inner surface of the cryostat.

* * * * *